United States Patent Office 3,632,711
Patented Jan. 4, 1972

3,632,711
PROCESS FOR COMBING THE OPPOSITE SIDES OF A SANDWICH-LIKE TUBULAR POLYMERIC SHEET
Ole-Bendt Rasmussen, Topstykket 7, DK–3460, Birkerod, Denmark
Filed Apr. 7, 1969, Ser. No. 813,954
Claims priority, application Denmark, Apr. 9, 1968, 1,563/68; Apr. 10, 1968, 1,614/68; June 11, 1968, 2,719/68; Sept. 18, 1968, 4,478/68
Int. Cl. B29d 7/02
U.S. Cl. 264—70
18 Claims

ABSTRACT OF THE DISCLOSURE

Method for combing the opposite sides of a tubular fluid sandwich-like sheet comprising interspersed layers of two different extrudable materials, at least one of which is a polymer, with relatively rotating generally opposed arrays of combing teeth, while the sheet is passing through an annular extrusion chamber.

---

Figure 1:
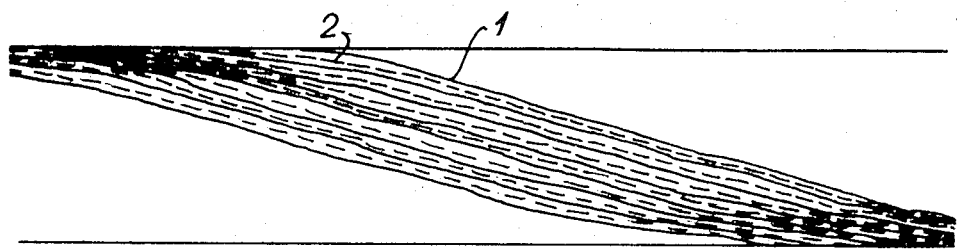

This invention relates to a process for producing a synthetic sheet material in which a first polymeric material and a second extrudable material are extruded into an annular collecting chamber to form therein a fluid sandwich-like sheet comprising interspersed layers of said first polymeric material and said second extrudable material, and out of an annular exit slot and is then caused to solidify in the structural form thus assumed.

The second extrudable material will generally also be a polymeric material, but since in some cases the second material serves mainly as a temporary separating agent which does not remain in or at least does not have any structural function in the final product, the second material may be non-polymeric, e.g. a paste.

In a first example of such a process, which is described in U.S. patent application, Ser. No. 694,660, filed Nov. 29, 1967, and now U.S. Pat. 3,547,761 issued Dec. 15, 1970, now abandoned, the fluid sandwich-like sheet is produced by extruding separate streams of the first polymeric material and the second extrudable material into the collecting chamber and uniting these streams in the collecting chamber to form a fluid sheet consisting of interspersed lamellae of the first polymeric material and the second extrudable material, and the walls of the collecting chamber are rotated relative to one another transversely of the direction of extrusion to draw out the sides of the lamellae so as to form a sandwich-like sheet. In carrying out the process according to this example, the product leaving the exit slot will consist of interspersed lamellae of said first and said second material extending through the thickness dimension of the sheet and an angle with the surface thereof, which may be so small that the sheet has practically the character of a laminate.

In a second example of the process referred to, the first and the second materials are extruded into the collecting chamber through at least three separate annular extruding openings, the separate tubular sheets thereby formed being united in the collecting chamber to form a sandwich-like structure. In this case the layers in the sheet leaving the exit slot will be exactly parallel to the surfaces of the sheet so that this will be a true laminate.

It is the object of the invention to obtain a sheet material having an improved tear resistance as compared with the products that could be obtained by the process referred to as hitherto carried out.

With this object in mind, according to the present invention, said fluid sandwich-like sheet, on its way through said collecting chamber, is subjected from opposite sides to the action of combing means, which are caused to rotate relative to one another about the axis of said annular chamber, thereby in combination with the travel of said fluid sheet through said collecting chamber and said exit slot subdividing said materials from opposite sides along directions at an angle to each other.

Owing to the subdivision of the materials along different directions on opposite sides of the sheet, the two opposite halves of the sheet will have their predominant splittability in different directions. An incision submitted to tearing will therefore have a tendency to branch out in the two directions of splitting thereby achieving a certain smoothing out of the notch effect.

The combing may be restricted to a relatively small depth from each side of the sheet. However, it will generally be preferable to effect the combing at least through substantially all portions of the first polymeric material. Thus, if this polymeric material is present throughout the thickness of the sheet the combing should be effected from each side to a depth at least equal to one half of the thickness of the fluid sheet.

Preferably the combing means are caused to rotate in opposite directions so that the fibre-like structures formed by the combing effect adjacent one surface of the tubular sheet leaving the exit slot will follow left-handed helices while the fibre-like structures formed adjacent the other surfaces of the tubular sheet will follow right-handed helices. Thereby the fibre-like structures adjacent opposite surfaces of the sheet will be symmetrical with respect to the longitudinal direction of the sheet, and it may easily be obtained that upon inflation and stretching of the extruded tube in known manner the combing directions of the opposite sides of the finished product are essentially at right angles with one another, this being obtained by suitably selecting the values used for the speed of rotation of the combing means, the extruding speed, the blowing ratio and the stretching ratio.

As applied to the process referred to above as the first example, the combing step according to the invention may preferably be carried out by combing means provided on the walls of the collecting chamber so that the combing is produced by the mutual rotation of the walls of the collecting chamber used for drawing out the sides of the lamellae so as to form a sandwich-like sheet. Thus no additional steps are required in order to obtain the combing.

As applied to the process referred to above as the second example, a similar arrangement may be used, but in that case the mutual rotation of the walls of the collecting chamber will be effected expressly for the purpose of performing the combing step by means of teeth provided on the said walls, seeing that in this case no such rotation is required in order to form the sandwich-like structure, but this is formed by the mere step of extruding the first and second materials into the collecting chamber through at least three separate annular extruding openings and uniting the separate tubular sheets thereby formed in the collecting chamber.

In this embodiment of the invention it is at least theoretically imaginable that the combing could be carried out in such a way that each layer is again fused together into a continuous structure after having passed the teeth, leaving only memory lines along the combing pattern. However, this will not be the case in practice since there will always be a certain ploughing effect tending to break up the layer structure and thus in effect causing a formation of strips of one of the materials separated from one another by portions of the other material. This effect can with advantage be accentuated and one embodiment of the invention is therefore characterized in that during the combing a strong ploughing is effected to break up the layer strurcture. This can be obtained by performing the combing by means of combing teeth having an inclination forwards in the direction of rotation about the axis of the annular chamber.

Considering again the embodiment of the invention where the sandwich-like sheet is built up from lamellae, this embodiment may with advantage be used for the production of a continuous sheet material in which the first and the second materials remain in intimate adherence to one another.

Alternatively, this embodiment of the invention may be used for producing a fibrous material, in which case the second extrudable material mainly has the function of promoting or controlling the splittability of the structure by forming built-in splitting planes between the lamellae of the first polymer material. This principle of splitting is in itself described in U.S. patent application, Ser. No. 694,433, filed Dec. 29, 1967, and now abandoned, where lamellar sheet is produced in the same manner as described above and the connections between the lamellae of the first polymeric material are subsequently cleaved. As there described the sheet is additionally cut into longitudinal strips to form a yarn material.

As applied to the present invention, the cutting into longitudinal strips will be omitted, but the subsequent cleaving or disrupting step is maintained. Owing to the combing in different directions on opposite sides of the sheet material, the subdivided portions of the lamellae formed by this treatment will cross each other so that two thread directions are achieved like in a woven fabric. The cleaving or disrupting step may also be applied where the sandwich-like sheet is built up from tubular layers and thus more generally described the feature of the invention here considered is characterized in that the connections between the combed layers of said first polymeric material are at least partly disrupted after the sheet has left the annular slot.

The cleaving is preferably carried out by using an expanding agent, but other well known splitting methods may be used for the cleaving, such as rubbing, hammering and leaching.

Alternatively, an expanding agent may be used for producing a cellular material reinforced by fibre-like portions of a strong polymeric material.

No matter how one selects the particular means to form the fluid sandwich-like structure and to comb the latter, an important aspect of the process according to the invention is that the pattern of layers in crisscross subdivision can advantageously be applied to the admixing of a plasticizing component to a thermoplastic polymer. It hereby proves that this pattern gives the sheet much higher strength, in particular tear propagation resistance, than does a random admixture of plasticizing component. Thus, an embodiment of the invention is characterized in that the second extrudable material is a polymer which in the final product is softer than the first polymeric material.

The reason why the structure thus obtained produces a specially high tear propagation resistance is in part due to the well known fact that reinforcing fibres incorporated in a soft matrix are particularly well suited for resisting uneven stresses (the subdivided layers of first material forming a kind of fibres and the subdivided layers of second, soft material forming a kind of matrix) and in part due to the fact that the two opposite parts of the sheet show splittability in different directions. Thus an incision when submitted to tearing will have a tendency to branch out in the two directions of fissility, whereby the notch effect will become smoothed out.

For general strength purposes the best pattern for said admixture of a relatively soft component is obtained when the layers are produced by smearing out interspersed lamellae of the components as described above.

In this manner the layers to become combed will be quite thin, thus the "fibres" produced by the first component will actually be small strips. Immediately after the combing, these are distinctly bundled together in helical rows, but during their further passage through the collecting chamber and subsequently through the exit slot, they are subjected to a smearing-out which blurs the row structure, the strips of the first material being brought into an overlapping arrangement. This structure of the overlapping strips of the basic material, separated from the plasticizing material, is—in combination with the criss-cross arrangement—of importance for the strength properties achieved, viz a suitable combination of high tensile strength, tear propagation resistance, impact strength, and puncture resistance.

With particular view to the tear propagation resistance the plasticized structure thus obtained can be further improved by extruding the two polymer materials into the collecting chamber in such a manner that the ratio of distribution between the second and the first polymeric material is essentially higher in a middle annular zone of the chamber than in annular zones on both sides thereof. Hereby a specially soft zone is produced in the middle of the material, giving the two opposite sheet parts the possibility of movement in relation to each other. Thereby, the tendency of tears to branch out is considerably increased, while essentially results in a further smoothing out of the notch effect during tearing. Normally, a tearing of the material produced according to the invention will proceed in such a way that the two halves are separated from each other in the area around the cut, and the energy used for the separation acts to absorb the tear effect.

According to one embodiment of the present invention, the second polymer material only is exrtuded in the aforesaid middle zone. Thus, a structure like that of a real laminate is produced, and the effect of the invention becomes very pronounced.

Although in fact the second polymer material can be an ordinary thermoplastic material, e.g. low density polyethylene, if only it is definitely softer than the first polymer material, it is an advantage to use a material which in its normal state has the characteristics either of an elastomer material or of a pressure sensitive adhesive, since then the plasticizing effect will be especially high. With particular advantage a material can be used which essentially is either a copolymer of propylene and ethylene or mainly consists of atactic polypropylene, since these materials are both well suited for extrusion and inexpensive.

As the first polymer material, on the other hand, a pronouncedly crystalline polymer should be used, since the individual fibres thus exhibit the highest tensile strength. High density polyethylene, or isotactic or syndiotactic polypropylene are particularly suited for practical purposes because of their low price in relation to the tensile strength, and of the suitability of these materials for extrusion. However, it is also possible to use non-crystalline polymers, e.g. polyvinylchloride, which has not been plasticized in advance, or has only been plasticized to a small extent.

If the two sides of the exit slot are rotating relative to each other, it can become difficult to carry out an extrusion where the surfaces of the material possess a higher viscosity than the middle part, because in that case a turbulence is easily produced. Therefore it will often be advantageous to choose the materials in such a way that they either have substantially the same viscosity, or that the second polymer material has a higher viscosity than the first one.

If the first polymer material is a pronouncedly crystalline one, and the second material has pronounced characteristics of an elastomer or a pressure-sensitive adhesive, the ratio of distribution between the first and the second polymer material in the zones on either side of the soft, central zone should be far below 50:50, as a norm preferably between 2:98 and 15:85.

Besides the two polymer materials mentioned, it can be an advantage to incorporate yet a third polymer material as a surface layer, this third polymer being chosen to act as a welding agent or to modify the frictional properties. If the first polymer material is high density polyethylene, thus the third material can be low density polyethylene to allow easy sealing.

The combing should preferably be carried out with such efficiency that the fineness of the fibres reaches into the interval between 1 and 20$\mu$. In order to achieve this, several rows (e.g. 4–10 rows) of very fine and close-set teeth are placed on each side of the collecting chamber.

For special purposes a coarser structure may be desirable when mixing the first polymer material and the softer second polymer material, and under such conditions it is desirable to shape the layers of the fluid sheet material directly from annular orifices as described above. What has been stated in the foregoing paragraphs regarding the choice of said two components also applies in this case, and further it is advisable, for similar reasons as above, to administer the components in such manner that the sheet becomes softest in the middle. Thus, the second polymer material can advantageously be extruded in such a manner as to form an intermediate one of said tubular sheets.

The rotational movement generally supplies each of the combed layers of first material with a certain but usually very low degree of molecular orientation in the "fibre" direction. This orientation usually increases during the subsequent draw down and/or blowing in molten and semimolten state carried out in direct continuation of the extrusion, but will usually remain rather low at this stage.

No matter whether the structure of the final product will be disrupted, or the structure is intended to remain substantialy undisrupted with the second material serving as a plasticizer, it will generally be advantageous to carry the molecular orientation further by drawing the sheet biaxially upon solidification of the first polymer material. The said drawing should preferably be done while the second material is in a substantially more flowable state than the first polymer (for instance still molten or semimolten). Although the stretching is carried out biaxially, the first polymer material will then generally become uniaxially oriented within each of the two halves of the sheet, due to the rather fibrous form of the first polymer material and to the presence of a kind of matrix (the second material) which easly yields. In other words, the result is a kind of laminate of two films which are molecularly oriented in different directions.

The invention also relates to an apparatus for carrying out the process described. The apparatus is of the kind comprising an annular collecting chamber, means for extruding a first polymeric material and a second extrudable material into said collecting, chamber, means for forming in said collecting chamber a fluid sandwich-like sheet consisting of interspersed layers of the first polymeric material and the second extrudable material and means for removing the sandwich-like foil through an exit slot and for causing said sheet to solidify in the structural form thus assumed, and the distinguishing feature of the invention is that it additionally comprises combing means extending from both sides into the path of movement of said fluid sandwich-like sheet through said collecting chamber and said exit slot, said combing means being rotatable relative to one another about the longitudinal axis of the apparatus.

Figures 2, 3:
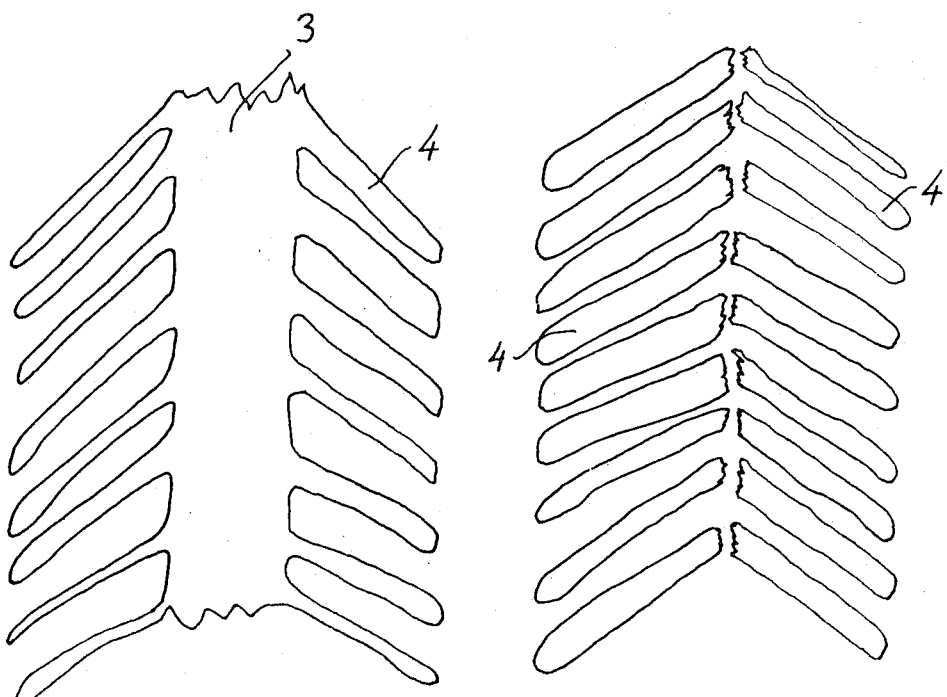
Figure 4:
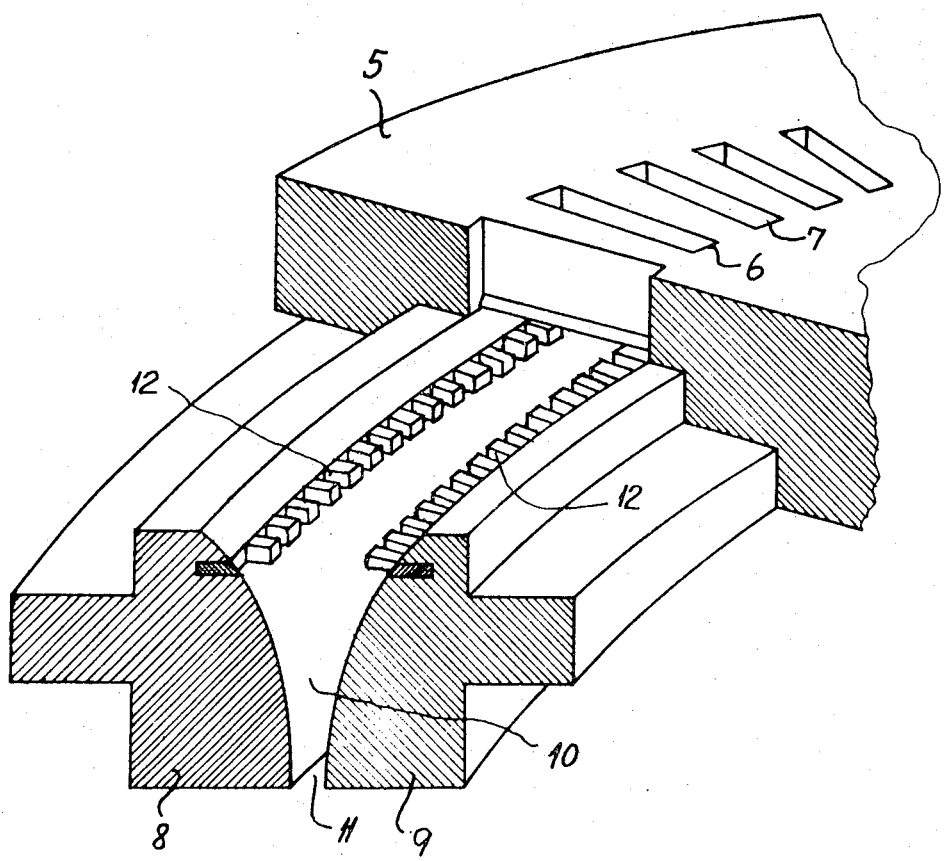
Figure 5:
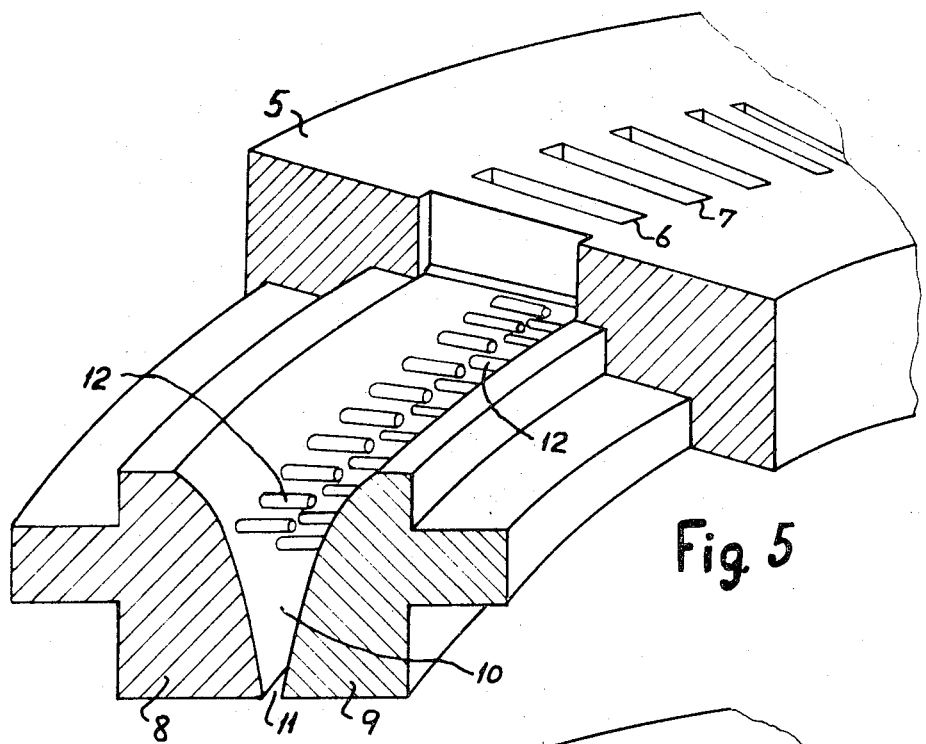
Figure 6:
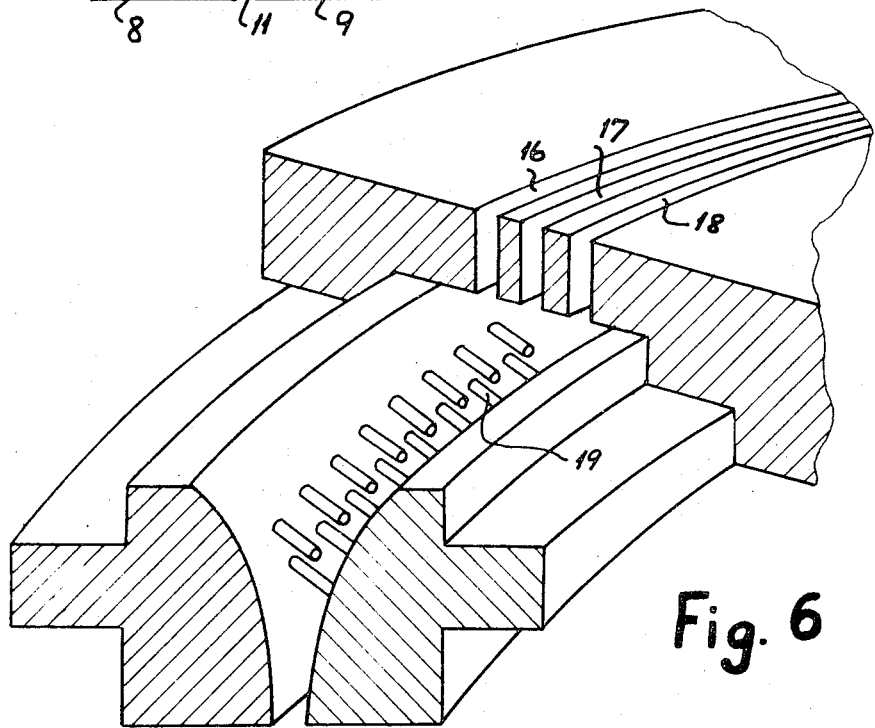
Figure 7:
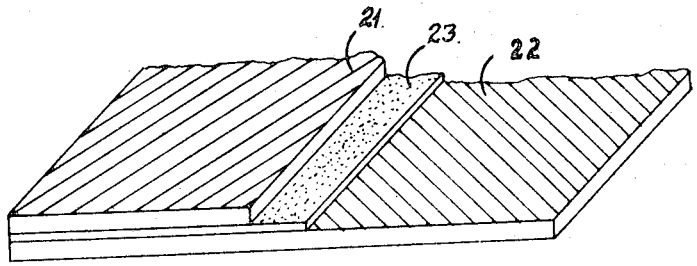
Figure 8:
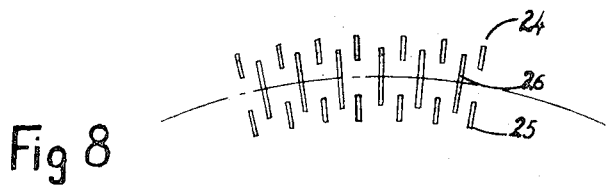
Figure 9:
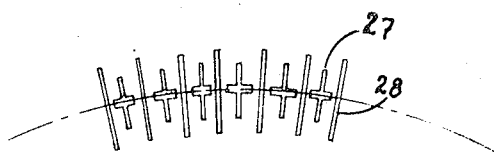
Figure 10:
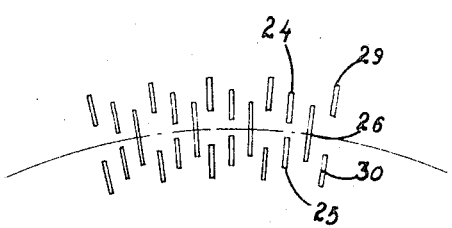

The invention will now be described in further detail with reference to the accompanying drawings, in which:

FIG. 1 represents a section through an extruded sheet material at right angles to the continuous dimension of the lamellae and before the combing of the sheet, FIG. 2 shows one lamella taken from a sheet material produced by the process according to the present invention, FIG. 3 shows another form of lamella taken from another sheet material produced by the process according to the present invention, FIG. 4 represents the row of openings and the collecting chamber in an apparatus according to one embodiment of the present invention, FIG. 5 represents the row of openings and the collecting chamber in an apparatus according to another embodiment of the present invention, FIG. 6 illustrates an apparatus according to a further embodiment of the invention incorporating annular openings for extruding the materials into the collecting chamber, FIG. 7 shows in perspective view with partial section a special form of sheet material produced by the process according to the invention, FIG. 8 shows a section of the circular line of openings in the extruding apparatus in an embodiment of the invention, in which the central zone is kept completely free of the first polymer material, FIG. 9 shows a corresponding section in an embodiment with a simplified nozzle form, in which application of the first polymer material into the middle zone is not completely avoided, and FIG. 10 shows an embodiment, with a nozzle form where a third polymer material is supplied to both surfaces, this third material serving to make the material weld easily to itself.

In FIG. 1, 1 indicates the first polymer material and 2 the second polymer material. For the sake of clarity the lamellae are shown as lines, but must be understood to have an average thickness represented by the distance between the fully drawn and the dotted lines. Thus, these lines represent the width dimension of the lamellae. The length dimension of the latter extends in the longitudinal direction of the sheet, i.e. perpendicularly to the plane of the drawing. In this direction the lamellae may be continuous in the whole length of the sheet. The thickness of the lamellae and their angles to the plane of the sheet material are greatly exaggerated. In reality the characteristic angle between the lamellae and the plane of the sheet material is usually less than 2°, and the thickness of the lamellae of the first polymer material is usually within the interval between 0.1 and 10$\mu$.

FIG. 2 shows an example of the form of a single lamella after the sheet has been combed from opposite sides in different directions. The lamella shown in FIG. 2 consists of a continuous middle section 3, from which lobe-shaped parts extend at an angle of about 45° to the longitudinal direction of the middle section. In the finished product the lobes or tongues 4 on one side of the middle section are parallel or approximately parallel to one side of the sheet material, while the lobes on the other side of the material are also parallel or approximately parallel with the surface.

If the material is composed of lamellae of the kind shown in FIG. 2, the lobes on opposite sides of the material will thus cross each other at an angle of about 90°. If the combing from both sides of the sheet material is carried to a depth of more than half the thickness of the material at that particular place, the lamellae are divided in the manner shown in FIG. 3. As will be seen from the latter, there is no middle section, since the lobes are cut off at the middle of the lamellae.

A sheet material consisting of lamellae of the type in FIG. 2 is best produced by an apparatus with a row of openings and a collecting chamber of the kind shown in FIG. 4. In FIG. 4 a circular extruding nozzle part 5 is shown comprising alternate slits 6 and 7, through which the first and the second polymer material respectively can be extruded into a collecting chamber.

Beneath the circular extruding nozzle part 5 are placed two annular moving parts 8 and 9, which together form the said collecting chamber 10 having an exit slot 11. In the collecting chamber 10, a row of teeth 12 is mounted on each of the parts 8 and 9. While only one such row is shown, it will generally be preferable in practice to use a plurality of rows.

During extrusion separate streams of the first and the second polymer material enter into the collecting chamber and are united therein to form a fluid sheet consisting of interspersed lamellae of the first and the second polymer material. At first the width dimension of the lamellae is substantially radial. However, during extrusion the parts 8 and 9 are rotated in opposite directions. Thereby, the sides of the lamellae are frictionally caught by the oppositely rotating walls of the chamber and are thereby drawn out in opposite directions or in other words the lamellae are tilted and transversely extended, whereby their thickness is at the same time reduced. The resulting pattern of the lamellae is that shown in FIG. 1. It is to be observed that the geometrical shape of the lamellae before drawing out is not essential to obtain such a pattern after drawing out.

By means of the rows of teeth 12 a combing of the material is carried out simultaneously with the extrusion through the exit slot 11. Since parts 8 and 9 rotate in opposite directions, the lobes formed by the combing on one side of the material will cross the lobes formed on the other side of the material.

In the drawing, the teeth 12 are shown at a very short distance from the slits 6 and 7. This is rather advantageous for constructional purposes, but is not a matter of principle. On the contrary, good results can be obtained even when this distance is very long.

The parts 8 and 9 forming the walls of the collecting chamber may be subdivided into sections, some of which are stationary. Particularly, the walls of the exit slot are preferably formed by stationary sections, whereby the haul-off is facilitated.

The apparatus shown in FIG. 5 is more or less identical with that shown in FIG. 4, with the exception that the teeth in the row of teeth 12 here are so long that they overlap. Besides the teeth are shown with circular cross-section instead of rectangular cross-section, which is optional. With the apparatus shown in FIG. 5, treatment of a sheet material consisting of lamellae will result in lobes of the type shown in FIG. 3.

After the tubular sheet has left the exit slot 11 it is usually inflated or "blown" during haul-off by means of haul-off rollers, thereby being stretched. It may thereafter be subjected to various additional treatments which are well known in the art, including additional stretching. Depending on the polymer materials used, the conditions of extrusion and the nature of any subsequent treatment, the apparatus shown may be used optionally for the production of continuous sheet material or fibrous sheet material of textile character, as previously described.

In an alternative form of process and apparatus illustrated in FIG. 6, the formation of layers by the extrusion of interspersed lamellar streams and subsequent drawing out of the sides of the lamellae is replaced by a direct extrusion of tubular layers by means of a series of annular orifices 16, 17 and 18 and the teeth 19 are arranged in such a manner that they perform a strong ploughing action. This method produces a coraser structure, which however is suitable for a number of purposes. The strong ploughing action is achieved by arranging the teeth at an angle to the radial direction such that their free ends point in the direction of rotation. Hereby a draught will be exerted from the middle towards the surfaces of the fluid sheet structure in the immediate surroundings of each tooth so that the layer structure will become displaced. However, even radially arranged teeth will normally exert a sufficient ploughing action.

This process can be applied as well to the production of disrupted sheeting material as to the production of non-disrupted strong sheets in which the strength may be produced or promoted by the well-ordered intermixing of a plasticizing component. For the latter purpose it is preferable that the middle orifice 17 should extrude the relatively soft polymer component, while 16 and 18 should extrude the relatively stiff polymer component. In this connection, 16 and 18 may if desired extrude different polymers simultaneously, each being stiffer than the polymer extruded through 17. Although only three extrusion orifices 16, 17 and 18 are shown in the drawing, it is on principle generally advantageous to use as many as a practical construction allows. For the purpose of intermixing a plasticizing component it is, however, always advisable to feed the different orifices in such proportions that the middle zone of the sheet will become particularly soft.

In the sheet shown in FIG. 7, the method of FIGS. 4 or 5 (but with modified extrusion orifices) has been used to intermix stiff and soft polymer materials in an arrangement which is particularly suitable for obtaining high tear propagation resistance. 21 and 22 indicate two opposite parts of the sheet having relatively low contents of the soft component, the hatching symbolizing the different "fibre" directions as formed by the combing, while 23 indicates an intermediate zone which contains high amounts of the soft component and may even consist of this component alone. Whether or not this intermediate zone is combed is not very essential.

By making a cut into the material and subsequent tearing, the layers 21 and 22 will each split along its own fibre direction. Owing to the contents of the soft second polymer material between the reinforcing "fibres," however, the splitting does not normally take place in a sharp manner but rather as a flow in the direction in question. The soft zone 23 enables zones 21 and 22 to split up more or less independently of each other. Generally, the result of this will be a delaminating in a triangular area, the points of which are defined by the end of the original incision on the one hand and the end points of the splitting zones 1 and 2 respectively on the other hand.

This sheet is well suited as packing material, for bags, heavy duty bags, tarpaulins, and agricultural films. Owing to its high tear resistance, holes may be stamped into it without weakening it essentially. It is possible to produce it in thickness down to $15\mu$ or even thinner, which is important e.g. for light packaging purposes, but on the other hand it can also with advantage be used in thicknesses up to $500\mu$ or even more, e.g. for extra heavy duty bags.

In FIG. 8, 24 and 25 shows nozzle openings for the relatively stiff polymer material while 26 indicates nozzle openings for the relatively soft polymer material. Through the drawing out or smearing effect described with reference to FIGS. 4 and 5 the individual lamellae of the soft polymer material will flow together in the middle zone, where they will form a continuous film.

In FIG. 9, 27 shows nozzle openings for the soft, second polymer material and it will be seen that these are designed for feeding most material in the middle zone, whereas the nozzle openings 28 for the first polymer material are designed for a practically uniform feeding all over the section. However, the higher feeding of the second polymer material in the middle zone will displace a large portion of the first polymer material from this zone so that the lamellae of the latter material will become quite thin in the middle.

The arrangement shown in FIG. 10 differs from the one in FIG. 8 in so far as two extra sets of nozzle openings 29 and 30 are included, through which a special material for the surface is introduced. This is supplied from a third extruder through a third system of channels. This surface material may either be an easily sealable material or a material having a suitable coefficient of friction.

Similarly, still further sets of openings may be used for introducing further components into the sheet and by the location and shape of these openings it can be controlled where these components will be present in the sheet. For instance it may be advantageous to introduce a particularly stiff component near the surfaces of the sheet and a particularly soft component in the very middle of the sheet.

In FIGS. 8 and 10 the openings 22 and 23 and the openings 29 and 31 respectively are shown on a level with each other. They can, however, be on different levels from each other instead.

What is claimed is:

1. In a process for producing a synthetic sheet material by the steps comprising delivering an extrudable polymeric material and a second different extrudable material into an annular collecting chamber to form therein a fluid sandwich-like sheet comprising interspersed layers of said two materials, removing said sandwich-like sheet out of an annular exit slot from said chamber and then solidifying said sheet in the structural form thus assumed, the improvement comprising subjecting said sheet while passing through said collecting chamber and out of said slot to generally opposed arrays of mutually facing combing teeth, and rotating said arrays relative to one another about the axis of said annular chamber, whereby as a consequence of the sheet movement in the extrusion direction and the relative rotation of said arrays of combing teeth, said sheet is subdivided from opposite sides along directions at an angle to each other.

2. A process as in claim 1, characterized in that said arrays of combing teeth are rotated in opposite directions.

3. A process as in claim 1 wherein the fluid sandwich-like sheet is produced by feeding a plurality of separate streams of said polymeric material and said second extrudable material into the collecting chamber and uniting these streams in the collecting chamber in the form of a fluid sheet consisting of interspersed lamellae of the first polymeric material and the second extrudable material, and the walls of the collecting chamber are rotated relative to one another transversely of the direction of extrusion to draw out the sides of the lamellae so as to form a sandwich-like sheet.

4. A process as in claim 1, characterized in that the first and second materials are extruded into the collecting chamber through at least three separate concentric annular extrusion orifices, the separate tubular sheets thereby formed being united in the collecting chamber to form a sandwich-like structure.

5. A process as in claim 4, wherein the combing teeth are sufficiently long and wide to substantially break up the layer structure.

6. A process as in claim 3, characterized in that the connections between the combed layers of said first polymeric material are at least partly distrupted after the sheet has left the annular slot and solidified by subjecting said sheet to a mechanical disrupting treatment.

7. A process as in claim 1, characterized in that the second extrudable material is a polymer which in its solid state is softer than said first polymeric material.

8. A process as in claim 3, characterized in that the two polymer materials are extruded into the collecting chamber in such a manner that the ratio of distribution between the second and the first polymeric material is essentially higher in a middle annular zone of the chamber than in annular zones on both sides thereof.

9. A process as in claim 8, characterized in that only the second polymer material is extruded into the said middle annular zone.

10. A process as in claim 7, characterized in that said second polymer material is extruded through an intermediate one of said concentric annular orifices.

11. A process as in claim 7, in which said second polymeric material is an elastomer or a pressure sensitive adhesive.

12. A process as in claim 11, in which said second polymeric material is a co-polymer of propylene and ethylene.

13. A process as in claim 11, in which said second polymeric material is atactic polypropylene.

14. A process as in claim 7, in which said first polymeric material is a crystalline polymer.

15. A process as in claim 14, characterized in that said first polymeric material is high-density polyethylene.

16. A process as in claim 14, characterized in that said first polymeric material is iso-tactic or syndiotactic polypropylene.

17. A process as in claim 1, characterized in that the combing is effected through substantially the entirety of said first polymeric material.

18. A process as in claim 1, characterized in that upon solidification of the first material said sheet is biaxially stretched.

References Cited

UNITED STATES PATENTS

| | | | |
|---|---|---|---|
| 3,256,560 | 6/1966 | Adomaitis | 264—108 X |
| 3,448,183 | 6/1969 | Chisholm | 18—13 PX |
| 3,019,483 | 2/1962 | Schultheiss | 264—171 X |

ROBERT F. WHITE, Primary Examiner

T. P. PAVELKO, Assistant Examiner

U.S. Cl. X.R.

18—13 P; 264—75, 171, 173